United States Patent [19]

Kato et al.

[11] 4,325,333

[45] Apr. 20, 1982

[54] INTERNAL COMBUSTION ENGINE EQUIPPED WITH AN AUXILIARY COMBUSTION CHAMBER

[75] Inventors: Takashi Kato, Susono; Toshio Tanahashi, Toyota, both of Japan

[73] Assignee: Toyota Jidosha Kogyo Kabushiki Kaisha, Toyota, Japan

[21] Appl. No.: 175,889

[22] Filed: Aug. 6, 1980

Related U.S. Application Data

[62] Division of Ser. No. 39,905, May 17, 1979, abandoned.

[30] Foreign Application Priority Data

Jul. 20, 1978 [JP] Japan .................. 53-87669

[51] Int. Cl.³ .................. F02B 19/18
[52] U.S. Cl. .................. 123/260; 123/287; 123/661
[58] Field of Search .......... 123/260, 263, 268, 286, 123/287, 293, 661

[56] References Cited

U.S. PATENT DOCUMENTS

| | | | |
|---|---|---|---|
| 3,159,148 | 12/1964 | Nallinger et al. | 123/188 M |
| 4,147,150 | 4/1979 | Yokota et al. | 123/287 |
| 4,182,279 | 1/1980 | Sato et al. | 123/268 |

FOREIGN PATENT DOCUMENTS

883106 6/1943 France .................. 123/286

Primary Examiner—Craig R. Feinberg
Attorney, Agent, or Firm—Stevens, Davis, Miller & Mosher

[57] ABSTRACT

An internal combustion engine comprises a main combustion chamber and an auxiliary combustion chamber which are interconnected to each other via a connecting passage. The spark plug is arranged in the connecting passage. The engine further comprises a first raised portion formed on the inner wall of the cylinder head, a second raised portion formed on the top face of the piston at a position opposite to the first raised portion with respect to the axis of the piston, and a third raised portion formed on the inner wall of the cylinder head above the second raised portion. A first flat squish area is formed between the flat peripheral top face of the piston and the flat bottom face of the first raised portion. A second spherical shell shaped squish area is formed between the spherical bottom wall of the third raised portion and the spherical rear face of the second raised portion. The intake port has a helical shape for creating a swirl motion rotating about the vertical axis of the cylinder in the main combustion chamber at the time of the intake stroke.

12 Claims, 10 Drawing Figures

Fig. 10

INTERNAL COMBUSTION ENGINE EQUIPPED WITH AN AUXILIARY COMBUSTION CHAMBER

This is a division of application Ser. No. 039,905 filed May 17, 1979, now abandoned.

DESCRIPTION OF THE INVENTION

The present invention relates to a construction of the combustion chamber of an internal combustion engine.

As a method of simultaneously reducing the amount of harmful HC, CO and $NO_x$ components in the exhaust gas, a method of using a lean air-fuel mixture has been known. In addition, as a method of reducing the amount of harmful $NO_x$ components in the exhaust gas, a method of using a mixture containing the recirculated exhaust gas therein has been known. However, in either the case wherein a lean air-fuel mixture is used or the case wherein a mixture containing the recirculated exhaust gas therein is used, a problem occurs in that, since the flame speed of either mixture is very low and the burning velocity is thus low, a stable combustion cannot be obtained. In order to obtain a stable combustion by using a lean air-fuel mixture or a mixture containing the recirculated exhaust gas therein, it is necessary to increase the burning velocity. As an engine capable of increasing the burning velocity, the inventor has proposed an engine in which a combustion chamber comprises a main combustion chamber and an auxiliary combustion chamber, which are interconnected to each other via a connecting passage, and a spark plug is arranged in the connecting passage. In this engine, the mixture forced into the auxiliary combustion chamber from the main combustion chamber during the compression stroke is ignited by the spark plug and, thus, the burning jet is injected into the main combustion chamber from the auxiliary combustion chamber. In the above-mentioned engine, it is true that, since the space around the spark gap of the spark plug is scavenged by the mixture following in the connecting passage during the compression stroke, ease of ignition can be ensured, and that, since a turbulence is caused in the main combustion chamber by the burning jet injected from the auxiliary combustion chamber, the burning velocity can be increased. However, since it is impossible to cause a strong turbulence in the main combustion chamber only by the burning jet injected from the auxiliary combustion chamber, a satisfactory high burning velocity cannot be obtained. As an engine capable of creating a strong turbulence in the main combustion chamber, the inventor has proposed an engine equipped with an auxiliary combustion chamber, which is capable of creating a swirl motion rotating about the horizontal axis in the main combustion chamber by the squish flow. This engine comprises a first downwardly projecting raised portion formed on the periphery of the inner wall of the cylinder head and having a flat bottom face so as to form a first squish area between the flat bottom face of the first raised portion and a flat peripheral portion of the top face of the piston when the piston approaches the top dead center. In addition, this engine further comprises a second upwardly projecting raised portion formed on the top face of the piston at a position opposite to the flat peripheral portion of the top face of the piston with respect to the axis of the cylinder so as to form a second squish area between the inner wall of the cylinder head and the rear face of the second raised portion when the piston approaches the top dead center. In addition, in this engine, the second raised portion has an inclined front face which is exposed to the combustion chamber and smoothly connected to the flat peripheral portion of the piston, and the opening of the connecting passage is directed to the central portion of the front face of the second raised portion. At the end of the compression stroke, the mixture forced into the auxiliary combustion chamber from the main combustion chamber is ignited by the spark plug, and the burning jet is injected from the connecting passage towards the front face of the second raised portion of the piston. In the above-mentioned engine, since a strong turbulence is caused in the main combustion chamber by both the burning jet and the squish flow, the burning velocity can be considerably increased.

In the present invention, it is intended that the mixing operation between air and fuel, or between air and recirculated exhaust gas, be promoted by creating a strong swirl motion rotating about the vertical axis of the cylinder in the main combustion chamber at the time of the intake stroke. However, if the creation of the swirl motion rotating about the horizontal axis and cuased by the squish flow at the end of the compression stroke is suppressed by the swirl motion rotating about the vertical axis of the cylinder and caused at the time of the intake stroke, a considerable increase in the burning velocity cannot be expected. Consequently, in order to considerably increase the burning velocity, it is necessary to positively extinguish the swirl motion rotating about the vertical axis of the cylinder at the end of the compression stroke.

An object of the present invention is to provide an internal combustion engine capable of creating a swirl motion rotating about the vertical axis of the cylinder at the time of the intake stroke and extinguishing the swirl motion rotating about the vertical axis of the cylinder at the end of the compression stroke for creating a strong swirl motion rotating about the horizontal axis at the end of the compression stroke.

According to the present invention, there is provided an internal combustion engine comprising: a cylinder block having a cylinder bore therein; a cylinder head mounted on said cylinder block and forming therein an auxiliary combustion chamber; a first raised portion having on its lower end a flat bottom face and being formed on the periphery of an inner wall of said cylinder head so as to project downwards; a piston reciprocally movable in said cylinder bore and having a top face which has a flat peripheral portion approachable to said flat bottom face so as to create a first squish area therebetween at the end of the compression stroke for spouting out a first squish flow along the top face of said piston, the inner wall of said cylinder head and the top face of said piston defining therebetween a main combustion chamber connected to said auxiliary combustion chamber via a connecting passage; an intake valve movably mounted on said cylinder head for leading a combustible mixture into said main combustion chamber; an exhaust valve movably mounted on said cylinder head for discharging exhaust gas into the atomosphere; a second raised portion formed on the top face of said piston at a position opposite to said first raised portion with respect to an axis of said piston and having a rear face and a front face exposed to said main combustion chamber, said rear face being approachable to the inner wall of said cylinder head so as to create a second squish area therebetween at the end of the compression stroke for spouting out a second squish flow which moves forward in the upper interior of said combustion chamber in the direction opposite to the spouting direction of said first squish flows, said first and second squish flows cooperating with each other to create a strong swirl motion rotating about a horizontal axis in said main combustion chamber, and; a spark plug arranged in said connecting passage, wherein the improvement comprises an intake passage having a carburetor equipped with a throttle valve, and swirl motion creating means arranged in said intake passage for creating a swirl motion rotating about an axis of said piston in said main combustion chamber.

The present invention may be more fully understood from the description of preferred embodiments of the invention set forth below, together with the accompanying drawings.

DESCRIPTION OF PREFERRED EMBODIMENTS

Figure 1:
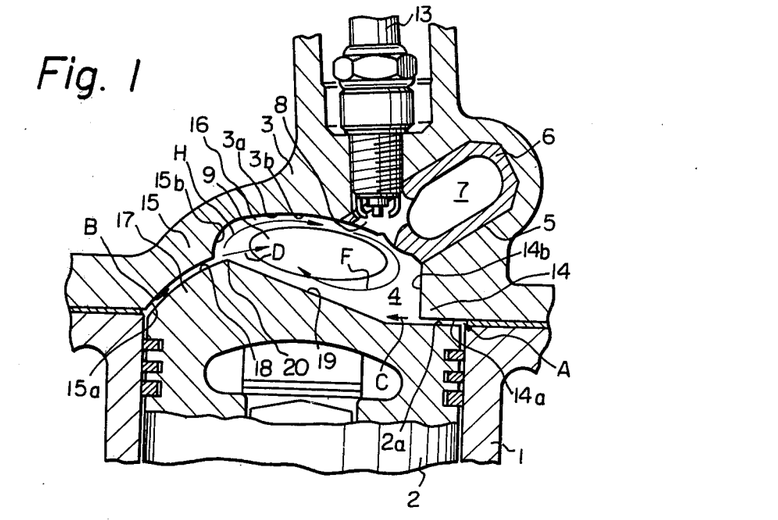
FIG. 1 is a cross-sectional side view of an embodiment an internal combustion engine according to the present invention.
Figure 2:
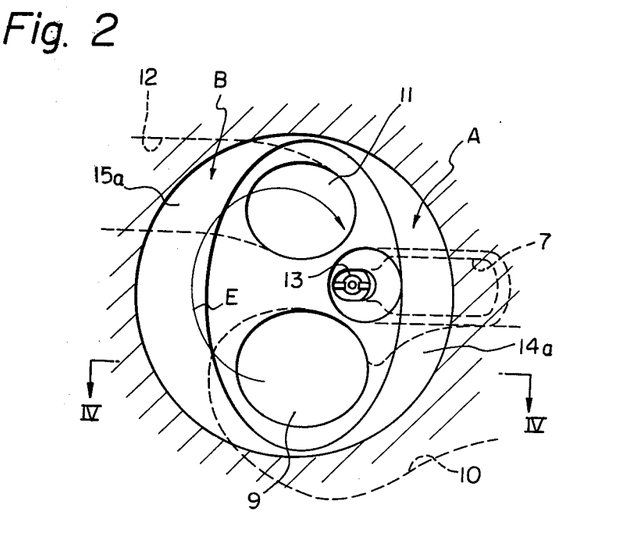
FIG. 2 is a bottom view of the cylinder head illustrated in FIG. 1.
Figure 3:
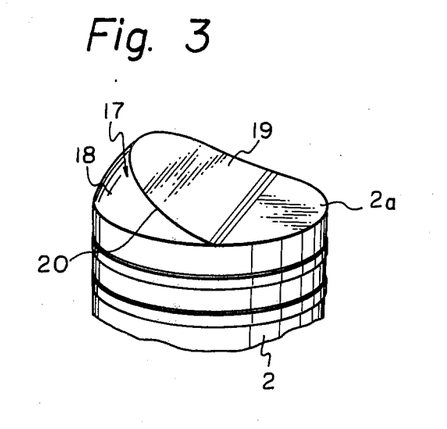
FIG. 3 is a perspective view of the piston illustrated in FIG. 1.

Referring to FIGS. 1 and 2, 1 designates a cylinder block, 2 a piston reciprocally movable in the cylinder block 1, 3 a cylinder head fixed onto the cylinder block 1 and 4 a main combustion chamber formed between the top face of the piston 2 and the inner wall 3a of the cylinder head 3; 5 designates a recess formed on the inner wall 3a of the cylinder head 3, 6 an auxiliary chamber component press-fitted into the recess 5, 7 an auxiliary combustion chamber formed in the auxiliary chamber component 6, and 8 a connecting passage formed in the auxiliary chamber component 6; 9 designates an intake valve, 10 an intake port, 11 an exhaust valve, 12 an exhaust port and 13 a spark plug.

Figure 4:
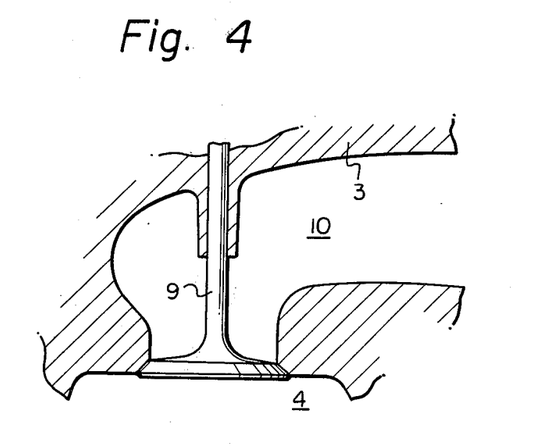
FIG. 4 is a cross-sectional side view taken along the line IV—IV in FIG. 2.

As is illustrated in FIGS. 2 and 4, the intake port 10 has a helical shape so that a swirl motion rotating about the vertical axis of the cylinder is created in the main combustion chamber 4 at the time of the intake stroke. In addition, the main combustion chamber 4 and the auxiliary combustion chamber 7 are interconnected to each other via the connecting passage 8, and the electrode of the spark plug 13 is arranged within the connecting passage 8. As is illustrated in FIG. 1, a dwonwardly projecting first raised portion 14 is formed on the periphery of the inner wall 3a of the cylinder head 3, and a downwardly projecting second raised portion 15 is formed on the inner wall 3a at a position opposite to the first raised portion 14 with respect to the axis of the piston 2, and the bottom wall 15a of the second raised portion 15 has a spherical shape. In addition, the second raised portion 15 has a steeply inclined side wall 15b extending upwards from the inner edge of the bottom wall 15a, and the side wall 15b is smoothly connected to the top face 3b of the main combustion chamber 4. Consequently, a depression 16 extending from the side wall 15b to the inner end portion 6a of the auxiliary chamber component 6 is formed on the inner wall 3a of the cylinder head 3.

The first raised portion 14 has a flat bottom face 14a and a substantially vertically extending side wall 14b, and the piston 2 has a flat peripheral portion 2a arranged to face the flat bottom face 14a of the first raised portion 14 so that, when the piston 2 is positioned at the top dead center as illustrated in FIG. 1, a flat squish area A is formed between the flat bottom face 14a of the first raised portion 14 and the flat peripheral portion 2a of the piston 2. On the other hand, a raised portion 17 is formed on the top face of the piston 2 at a position opposite to the flat peripheral portion 2a of the piston 2 with respect to the axis of the piston 2, and the rear face 18 of the raised portion 17 has a spherical shape complementary to the shape of the bottom wall 15a of the second raised portion 15 so that, when the piston 2 is positioned at the top dead center as illustrated in FIG. 1, a spherical shell shaped squish area B is formed between the bottom wall 15a of the second raised portion 15 and the rear face 18 of the raised portion 17. In addition, the raised portion 17 of the piston 2 has an inclined front face 19 exposed to the main combustion chamber 4 and smoothly extending from the flat peripheral portion 2a of the piston 2 to a ridge 20 of the raised portion 17. Since an engine according to the present invention has a construction as illustrated in FIG. 1, when the piston 2 approaches the top dead center, a pair of squish flows, shown by the arrows C and D in FIG. 1, is spouted from the squish areas A and B, respectively.

Figure 5:
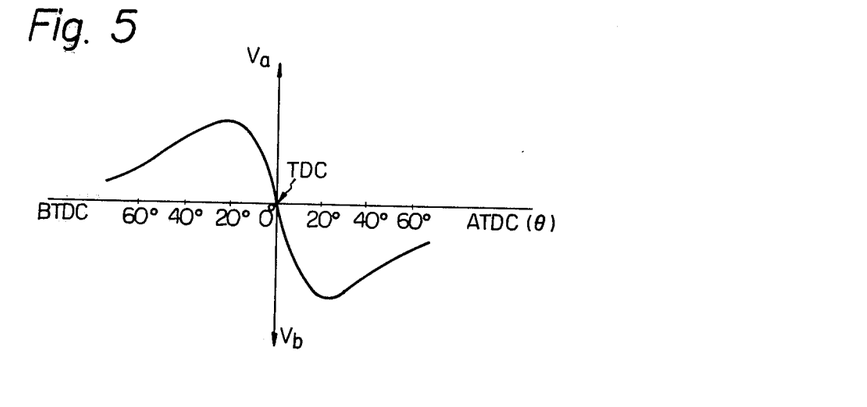
FIG. 5 is a graph showing change in the flow velocity of the squish flow.

FIG. 5 shows a flow velocity of the squish flow D, which is measured in the main combustion chamber 4 at a position near the ridge 20 of the raised portion 17. In FIG. 5, the ordinate Va indicates a flow velocity of the squish flow flowing in the direction illustrated by the arrow D, in FIG. 1; the ordinate Vb indicates a flow velocity of the gas flowing towards the squish area B, in FIG. 1, in the direction which is opposite to the direction illustrated by the arrow D, and; the abscissa θ indicates crank angle. From FIG. 5, it will be understood that the spouting operation of the squish flow flowing in the direction D is started at an approximate BTDC of 60 degrees, and the flow velocity Va of the squish flow D becomes maximum at an approximate BTDC of 20 degrees. In addition, it will be also understood that the maximum flow velocity Vb of the gas flowing towards the squish area B is slightly higher than the maximum flow velocity Va of the squish flow D.

During operation, at the time of the intake stroke, when the downward movement of the piston 2 is started, the pair of gas streams flowing towards the squish areas A and B at a high speed, in directions which are opposite to those of the squish flows C and D, respectively, is created in the main combustion chamber 4 due to the temporary pressure drop within the squish areas A and B, and a strong turbulence is thus created in the main combustion chamber 4. In addition, since the squish area B is arranged in the vicinity of the intake valve 9, the mixture flowing, while swirling, along the outer circumferential wall of the helically-shaped intake port 10, which is located on the lower side in FIG. 2, is sucked into the squish area B and, as a result, a strong swirl motion illustrated by the arrow E in FIG. 2 and rotating about the vertical axis of the cylinder is created in the main combustion chamber 4. This swirl motion E is maintained for a long time until the end of the compression stroke and, thus, the mixing operation between air and fuel or between air and recirculated exhaust gas is considerably promoted. As a result of this, the air-fuel ratio of the mixture in the main combustion chamber 4 becomes uniform over the entire region of the main combustion chamber 4. After this, when the piston 2 approaches the top dead center, since the piston 2 approaches the first raised portion 14 and the second raised portion 15, a swirl motion rotating along the inner wall of the cylinder is suppressed due to the presence of the first raised portion 14 and the second raised portion 15. As a result of this, the swirl motion rotating along the inner wall of the cylinder about the vertical axis of the cylinder becomes weak. After this, when the piston 2 further approaches the top dead center, since the squish flows C and D are spouted from the squish areas A and B, respectively, the swirl motion rotating about the vertical axis of the cylinder is extinguished by the squish flows C and D. Then, the squish flow C spouted from the squish area A flows towards the front face 19 of the raised portion 17, and the squish flow D spouted from the squish area B moves forward towards the connecting passage 8. Since the squish flow D does not contact both the top face 3b of the main combustion chamber 4 and the front face 19 of the raised portion 17 of the piston 2, the squish flow D moves forward in the main combustion chamber 4, and the, causes a microturbulence in the connecting passage 8. On the other hand, the squish flow C flowing towards the front face 19 of the raised portion 17 from the squish area A moves forward along the front face 19 of the raised portion 17 and, then, comes into violent contact with the squish flow D spouted from the squish area B. As a result of this violent contact, the flow direction of the squish flow D is changed so that the squish flow D flows along the top face 3b of the main combustion chamber 4 as illustrated by the arrow H in FIG. 1. At this time, since the flow direction of the squish flow C is changed by the steeply inclined side wall 15b of the raised portion 15, the squish flow C also flows along the top face 3b of the main combustion chamber 4, as illustrated by the arrow H in FIG. 1. By forming the steeply inclined side wall 15b which extends upwards from the ridge 20 of the raised portion 17, the squish flow D is not considerably decelerated by the squish flow C, and the squish flow C itself is also not considerably decelerated. Then, the squish flow H flowing along the top face 3b of the main combustion chamber 4 passed in front of the connecting passage 8 and moves downwards along the vertical side wall 14b. Thus, a strong swirl motion, shown by the arrow E, which is rotating about the horizontal axis is created in the main combustion chamber 4.

Then, the mixture is ignited by the spark plug 13. At this time, since a microturbulence is created in the connecting passage 8 as mentioned previously, the mixture is easily ignited and then the flame rapidly spreads within the auxiliary combustion chamber 7. As a result, the mixture in the auxiliary combustion chamber 7 is rapidly burned, and a strong burning jet is injected into the main combustion chamber 4 from the connecting passage 8. On the other hand, since a strong swirl motion E is created in the main combustion chamber 4, the flame swirls in the main combustion chamber 4 together with the strong swirl motion E and the burning velocity is thus considerably increased. In addition, since the flame swirls in the main combustion chamber 4, unburnt HC and CO located in the quench layers formed on the inner wall of the cylinder head 3 and on the top face of the piston 2 are burned. After this, when the downward movement of the piston 2 is started, the unburnt gas in the main combustion chamber 4 is sucked into the squish areas A and B together with the flame. As a result, the unburnt HC and CO located in the quench layers formed on the inner wall of the cylinder head 3 and on the top face of the piston 2 within the squish areas A and B are burned. In addition, the burned gas in the auxiliary combustion chamber 7 is pulled out into the main combustion chamber 4 via the connecting passage 8 by the stream of the burned gas sucked into the squish area B, and a turbulence of the unburned gas in the main combustion chamber 4 is further caused by the burned gas thus pulled out from the auxiliary combustion chamber 7 and, at the same time, the unburned mixture in the main combustion chamber 4 is burned by this burned gas. As a result, since the duration of the injecting operation of the burning jet becomes long, the burning velocity is considerably increased.

Figure 6:
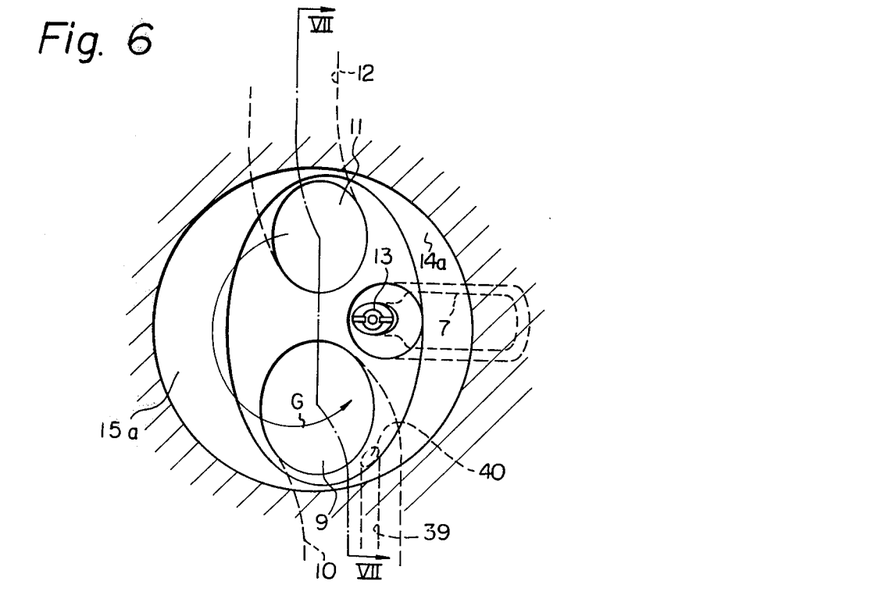
FIG. 6 is a bottom view of a cylinder head of another embodiment according to the present invention.
Figure 7:
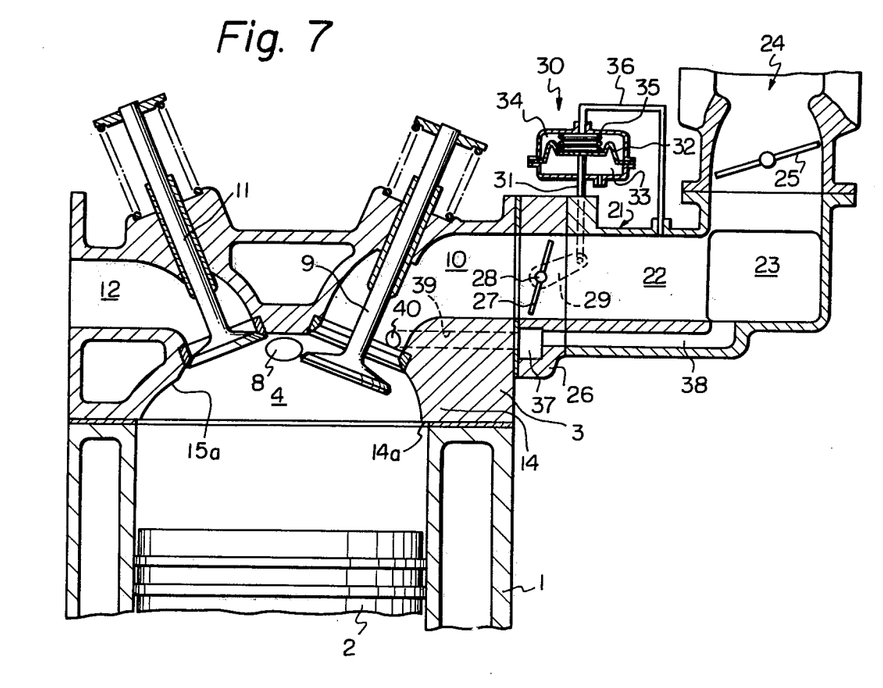
FIG. 7 is a cross-sectional side view taken along the line VII—VII in FIG. 6.

FIGS. 6 and 7 illustrate another embodiment according to the present invention. In FIGS. 6 and 7, similar components are indicated with the same reference numerals as used in FIG. 1. Referring to FIG. 7, reference numeral 21 designates an intake manifold, 22 a manifold branch, 23 a collecting portion of the intake manifold 21, 24 a carburetor and 25 a throttle valve of the carburetor 24. As is illustrated in FIG. 7, the intake manifold 21 is connected the intake port 10 via a spacer member 26, and a secondary throttle valve 27 is arranged in the spacer member 26. An arm 29 is fixed onto a throttle shaft 28 of the secondary throttle valves 27, and a control rod 31 of a vacuum operated diaphragm apparatus 30 is pivotally connected to the tip of the arm 29. The diaphragm apparatus 30 comprises an atmospheric pressure chamber 33 and a vacuum chamber 34, which are separated by a diaphragm 32. A compression spring 35 is inserted into the vacuum chamber 34 for always biasing the diaphragm 32 towards the atmospheric pressure chamber 33. The vacuum chamber 34 is connected to the inside of the intake manifold 21, located downstream of the throttle valve 25 via a vacuum conduit 36, and the control rod 31 is connected to the diaphragm 32.

As is illustrated in FIG. 7, when the engine is operating under a light load wherein the opening degree of the throttle valve 25 of the carburetor 24 is small, the level of vacuum produced in the intake manifold 21 is large. As a result of this, since the level of vacuum produced in the vacuum chamber 34 of the diaphragm apparatus 30 becomes large, the diaphragm 32 moves towards the vacuum chamber 34 against the spring force of the compression spring 35. As a result of this, the throttle shaft 28 is rotated, and the secondary throttle valve 27 is positioned at its closed position, as illustrated in FIG. 7. On the other hand, when throttle valve 25 of the carburetor 24 is opened to a great extent and, thus, the engine is operating under a heavy load, since the level of vacuum produced in the intake manifold 21 becomes small, the level of vacuum produced in the vacuum chamber 34 also becomes small. As a result of this, since the diaphragm 32 moves towards the atmospheric pressure chamber 33 due to the spring force of the compression spring 35, the throttle shaft 28 is rotated and, thus, the secondary throttle valve 27 is fully opened. As is illustrated in FIG. 7, a distribution channel 37 is formed in the spacer 26 and connected to the collecting portion 23 of the intake manifold 21 via an auxiliary intake passage 38. In addition, a channel branch 39, which is in communication with the distribution channel 37, is provided for each cylinder, and each of the channel branches 39 opens into the respective intake port 7. The opening 40 of each of the channel branches 39 is directed to a valve gap formed between the intake valve 9 and its valve seat. From FIG. 7, it will be understood that the distribution channel 37, the auxiliary intake passage 38 and the channel branches 39 have a cross-sectional area which is very much smaller than that of the manifold branches 22 of the intake manifold 21.

As mentioned above, when an engine is operating under a light load, the secondary throttle valve 27 is positioned at its closed position. Consequently, at this time, the mixture formed in the carburetor 24 is fed into the combustion chamber 4 of the cylinder which is in the intake stroke via the auxiliary intake passage 38, the distribution channel 37, the channel branch 39 and the intake port 10. As is illustrated in FIG. 7, the auxiliary intake passage 38, the distribution channel 37 and the channel branches 39 have an extremely small cross-sectional area. Consequently, since the mixture flows at a high speed in the auxiliary intake passage 38, the distribution channel 37 and the channel branch 39, the flow energy is added to the mixture and, as a result, the vaporization of fuel is promoted. Then, the mixture is spouted from the channel branch 39 into the intake port 10 of the cylinder which is in the intake stroke. At this time, since the opening 40 of the channel branch 39 is directed to the valve gap formed between the valve head of the intake valve 9 and the valve seat thereof when the intake valve 9 is opened, the mixture spouted from the channel branch 39 flows into the combustion chamber 4 at a high speed via the above-mentioned valve gap, and then, moves forward in front of the connecting passage 8. Then, the mixture causes a strong swirl motion rotating about the vertical axis in the main combustion chamber 4, as illustrated by the arrow G in FIG. 6. As mentioned above, since a strong swirl motion is created in the main combustion chamber 4 when the engine is operating under a light load, the mixing operation between the air and the fuel is promoted. On the other hand, since the secondary throttle valve 27 remains fully opened when the engine is operating under a heavy load, a large part of the mixture is fed into the main combustion chamber 4 via the manifold branch 22.

Figure 8:
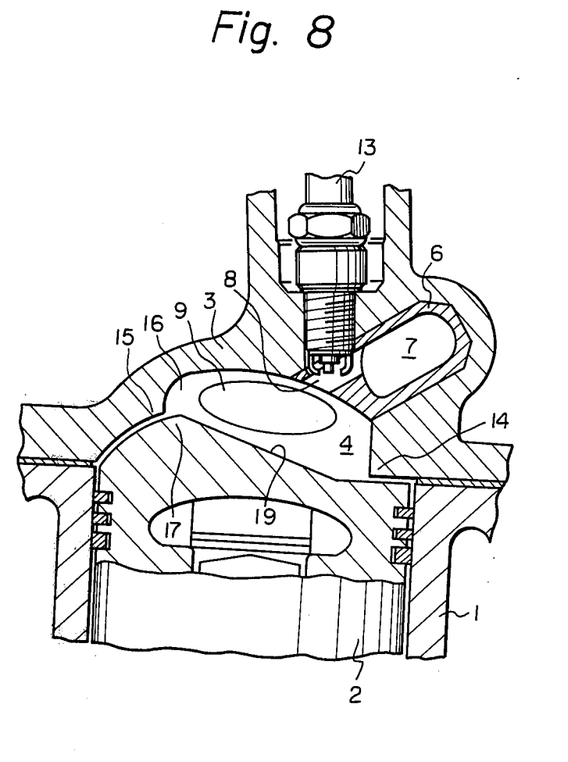
FIG. 8 is a cross-sectionside view of a further embodiment according to the present invention.
Figure 9:
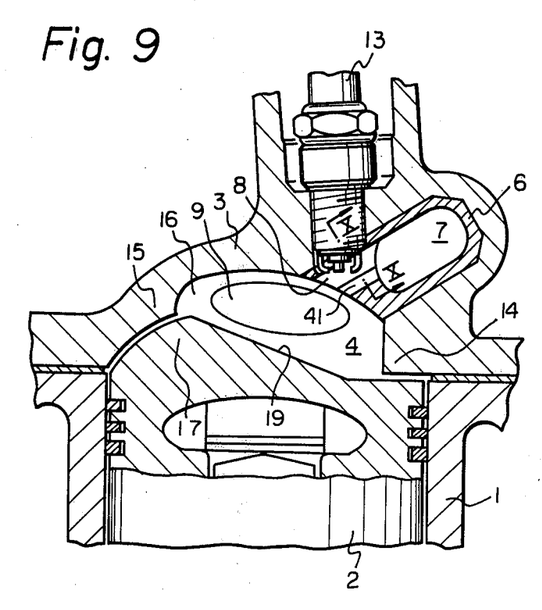
FIG. 9 is a cross-section side view of a still further embodiment according to the present invention.
Figure 10:
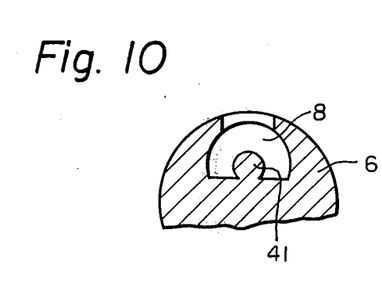
FIG. 10 is a cross-sectional view taken along the line X—X in FIG. 9.

In the embodiment illustrated in FIG. 1, the connecting passage 8 forms a diverging nozzle having a cross-section which is gradually increased towards the main combustion chamber 4. In this embodiment, particularly when the engine is operating under a light load, a part of the burning jet injected from the auxiliary combustion chamber 7 moves forward along the lower wall of the connecting passage 8 and is injected towards the front face 19 of the raised portion 17. However, instead of adopting the connecting passage 8 illustrated in FIG. 1, the connecting passage 8 may be so formed that it has a straight passage having a uniform cross-section over the entire length thereof, as illustrated in FIG. 8, and that the connecting passage 8 has a C-shaped cross-section, as illustrated in FIGS. 9 and 10. In the embodiment illustrated in FIGS. 9 and 10, the electrode of the spark plug 13 is arranged in the upper interior of the C-shaped connecting passage 8 above a projection 41 in FIG. 10.

According to the present invention, the mixing operation between air and fuel, or between air and recirculated exhaust gas, can be promoted by a continuous swirl motion rotating about the vertical axis from the beginning of the intake stroke to the end of the compression stroke. In addition, at the end of the compression stroke, since a swirl motion rotating about the vertical axis is extinguished and, at the same time, a strong swirl motion rotating about the horizontal axis is caused in the main combustion chamber, the burning velocity is considerably increased.

While the invention has been described with reference to specific embodiments chosen for purposes of illustration, it should be apparent that numerous modifications can be made thereto by those skilled in the art without departing from the spirit and scope of the invention.

What is claimed is:
1. An internal combustion engine comprising:
a cylinder block having a cylinder bore therein;
a cylinder head having an inner wall mounted on said cylinder block and forming therein an auxiliary combustion chamber having a longitudinal axis;
a first raised portion downwardly projecting from the periphery of the inner wall of said cylinder head, having a horizontally flat bottom face and an approximately vertical side wall exposed to said main combustion chamber;
a piston reciprocally movable in said cylinder bore, having a top face which has a horizontally flat peripheral portion approachable to said flat bottom face so as to create a horizontally planar first squish area therebetween at the end of the compression stroke for spouting out a first squish flow along the top face of said piston;
a main combustion chamber defined by the inner wall of said cylinder head and the top face of said piston;
a single connecting passage of C-shaped transverse cross-section and uniform size for its entire length, having a projection formed on a lower wall thereof, said connecting passage being fluidly interposed between said main chamber and said auxiliary chamber and extending substantially parallel to said longitudinal axis, said single connecting passage being the only connecting passage between said main chamber and said auxiliary chamber, the transverse cross section of said connecting passage being taken on a plane normal to a longitudinal axis of said auxiliary chamber;
an intake valve movably mounted on said cylinder head;
an exhaust valve movably mounted on said cylinder head;
a second raised portion formed on the top face of said piston at a position opposite to said first raised portion with respect to an axis of said piston, having a rear face and a front face exposed to said main combustion chamber;
a third raised portion formed on the inner wall of said cylinder head above said second raised portion, having a part-spherically shaped bottom wall, and a steeply inclined side wall spaced directly above and extending upwards from a ridge formed by the junction of said front and rear faces of said second raised portion, said rear face having a shape which is complementary to the shape of said part-spherical bottom wall, said rear face being approachable to said part-spherical bottom wall so as to create a part-spherical shell shaped second squish area therebetween at the end of the compression stroke for spouting out a second squish flow which moves forward in the upper interior of said main combustion chamber in the direction opposite to the spouting direction of said first squish flow, said first and second squish flows cooperating with each other to create a strong swirl motion rotating about a horizontal axis in said main combustion chamber; and an intake passage in fluid communication with said main combustion chamber through said intake valve, having a carburetor equipped with a throttle valve, and swirl motion creating means arranged in said intake passage for creating a swirl motion rotating about an axis of said piston in said main combustion chamber, said swirl motion creating means comprising a helically shaped portion of said intake passage located in the vicinity of said intake valve.

2. An internal combustion engine comprising:

a cylinder block having a cylinder bore therein;

a cylinder head having an inner wall mounted on said cylinder block and forming therein an auxiliary combustion chamber having a longitudinal axis;

a first raised portion formed on the periphery of the inner wall of said cylinder head so as to project downwardly, having on its lower end a flat bottom face;

a piston reciprocally movable in said cylinder bore, having a top face which has a flat peripheral portion approachable to said flat bottom face so as to create a first squish area therebetween at the end of the compression stroke for spouting out a first squish flow along the top face of said piston;

a main combustion chamber defined by the inner wall of said cylinder head and the top face of said piston;

a single connecting passage of C-shaped transverse cross-section and uniform size for its entire length fluidly interposed between said main chamber and said auxiliary chamber and extending substantially parallel to said longitudinal axis, said single connecting passage being the only connecting passage between said main chamber and said auxiliary chamber, the transverse cross section of said connecting passage being taken on a plane normal to a longitudinal axis of said auxiliary chamber;

an intake valve movably mounted on said cylinder head;

an exhaust valve movably mounted on said cylinder head;

a second raised portion formed on the top face of said piston at a position opposite to said first raised portion with respect to an axis of said piston, having a rear face and a front face exposed to said main combustion chamber;

a third raised portion formed on the inner wall of said cylinder head above said second raised portion, having a bottom wall, said rear face being approachable to the third raised portion so as to create a second squish area therebetween at the end of the compression stroke for spouting out a second squish flow which moves forward in the upper interior of said main combustion chamber in the direction opposite to the spouting direction of said first squish flow, said first and second squish flows cooperating with each other to create a strong swirl motion rotating about a horizontal axis in said main combustion chamber;

a spark plug arranged in said connecting passage; and an intake passage in fluid communication with said main combustion chamber through said intake valve having a carburetor equipped with a throttle valve, and swirl motion creating means arranged in said intake passage for creating a swirl motion rotating about an axis of said piston in said main combustion chamber.

3. An internal combustion engine comprising:

a cylinder block having a cylinder bore therein;

a cylinder head having an inner wall mounted on said cylinder block and forming therein an auxiliary combustion chamber having a longitudinal axes;

a first raised portion downwardly projecting from the periphery of the inner wall of said cylinder head, having a horizontally flat bottom face and an approximately vertical side wall exposed to said main combustion chamber;

a piston reciprocally movable in said cylinder bore, having a top face which has a horizontally flat peripheral portion approachable to said flat bottom face so as to creat a horizontally planar first squish area therebetween at the end of the compression stroke for spouting out a first squish flow along the top face of said piston;

a main combustion chamber defined by the inner wall of said cylinder head and the top face of said piston;

a single connecting passage of C-shaped transverse cross-section and uniform size for its entire length fluidly interposed between said main chamber and said auxiliary chamber and extending substantially parallel to said longitudinal axis, said single connecting passage being the only connecting passage between said main chamber and said auxiliary chamber, the transverse cross section of said connecting passage being taken on a plane normal to a longitudinal axis of said auxiliary chamber;

an intake valve movably mounted on said cylinder head;

an exhaust valve movably mounted on said cylinder head;

a second raised portion formed on the top face of said piston at a position opposite to said first raised portion with respect to an axis of said piston, having a rear face and a front face exposed to said main combustion chamber;

a third raised portion formed on the inner wall of said cylinder head above said second raised portion, having a bottom wall, said rear face being approachable to the third raised portion so as to create a second squish area therebetween at the end of the compression stroke for spouting out a second squish flow which moves forward in the upper interior of said main combustion chamber in the direction opposite to the spouting direction of said first squish flow, said first and second squish flows cooperating with each other to create a strong swirl motion rotating about a horizontal axis in said main combustion chamber;

a spark plug arranged in said connecting passage; and an intake passage in fluid communication with said main combustion chamber through said intake valve having a carburetor equipped with a throttle valve, and swirl motion creating means arranged in said intake passage for creating a swirl motion rotating about an axis of said piston in said main combustion chamber.

4. An internal combustion engine comprising:

a cylinder block having a cylinder bore therein;

a cylinder head having an inner wall mounted on said cylinder block and forming therein an auxiliary combustion chamber having a longitudinal axis;

a first raised portion having on its lower end a flat bottom face and being formed on the periphery of the inner wall of said cylinder head so as to project downwards;

a piston reciprocally movable in said cylinder bore and having a top face which has a flat peripheral portion approachable to said flat bottom face so as to create a first squish area therebetween at the end of the compression stroke for spouting out a first squish flow along the top face of said piston;

a main combustion chamber defined by the inner wall of said cylinder head and the top face of said piston;

a single connecting passage of C-shaped transverse cross section and uniform size for its entire length fluidly interposed between said main chamber and said auxiliary chamber and extending substantially parallel to said longitudinal axis, said single connecting passage being the only connecting passage between said main chamber and said auxiliary chamber, the transverse cross section of said connecting passage being taken on a plane normal to a longitudinal axis of said auxiliary chamber;

an intake valve movably mounted on said cylinder head;

an exhaust valve movably mounted on said cylinder head;

a second raised portion formed on the top face of said piston at a position opposite to said first raised portion with respect to an axis of said piston, having a rear face and a front face exposed to said main combustion chamber, said rear face being approachable to the inner wall of said cylinder head so as to create a second squish area therebetween at the end of the compression stroke for spouting out a second squish flow which moves forward in the upper interior of said main combustion chamber in the direction opposite to the spouting direction of said first squish flow, said first and second squish flows cooperating with each other to create a strong swirl motion rotating about a horizontal axis in said main combustion chamber;

a spark plug arranged in said connecting passage; and an intake passage in fluid communication with said main combustion chamber through said intake valve having a carburetor equipped with a throttle valve, and swirl motion creating means arranged in said intake passage for creating a swirl motion rotating about an axis of said piston in said main combustion chamber.

5. An internal combustion engine as claimed in claim 4, wherein said first raised portion has a horizontally flat bottom face and an approximately vertical side wall exposed to said main combustion chamber, said first squish area extending in a horizontal plane.

6. An internal combustion engine as claimed in claim 4, wherein said engine further comprises a third raised portion formed on the inner wall of said cylinder head above said second raised portion, having a bottom wall which cooperates with said rear face of said second raised portion for creating said second squish area therebetween.

7. An internal combustion engine as claimed in claim 6, wherein said bottom wall of said third raised portion has a part-spherical shape, said rear face of said second raised portion having a shape which is complementary to the shape of said part-spherical bottom wall for creating a part-spherical shell shaped squish area between said rear face and said part-spherical bottom wall.

8. An internal combustion engine as claimed in claim 7, wherein said third raised portion has a steeply inclined side wall spaced directly above and extending upwards from a ridge formed by by the junction of said front and rear faces of said second raised portion.

9. An internal combustion engine as claimed in any one of claims 4, 2, or 3, wherein a portion of said intake passage is located in the vicinity of said intake valve, said swirl motion creating means comprising said portion of said intake passage, the portion of said intake passage having a helical shape.

10. An internal combustion engine as claimed in any one of claims 4, 2, or 3, wherein said connecting passage has a projection formed on a lower wall there of, said spark plug being located on an upper wall of said connecting passage above said projection.

11. An internal combustion engine as claimed in any one of claims 4, 2, or 3, wherein said front face of said second raised portion is smoothly connected to said flat peripheral portion of the top face of said piston.

12. An internal combustion engine as claimed in claim 11, wherein said front face of said second raised portion is formed so as to be flat.

* * * * *